(12) United States Patent
Kraipak et al.

(10) Patent No.: US 8,635,470 B1
(45) Date of Patent: Jan. 21, 2014

(54) SYSTEM-ON-CHIP WITH MANAGEMENT MODULE FOR CONTROLLING PROCESSOR CORE INTERNAL VOLTAGES

(75) Inventors: Waseem Saify Kraipak, Maharashtra (IN); George Bendak, San Diego, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 601 days.

(21) Appl. No.: 12/900,828

(22) Filed: Oct. 8, 2010

Related U.S. Application Data

(63) Continuation-in-part of application No. 12/687,817, filed on Jan. 14, 2010, which is a continuation-in-part of application No. 12/639,064, filed on Dec. 16, 2009.

(51) Int. Cl.
*G06F 1/26* (2006.01)
*G06F 1/32* (2006.01)

(52) U.S. Cl.
USPC .............................. 713/300; 713/320; 713/322

(58) Field of Classification Search
None
See application file for complete search history.

(56) References Cited

U.S. PATENT DOCUMENTS

| 2006/0161375 | A1* | 7/2006 | Duberstein et al. | 702/132 |
| 2007/0070673 | A1* | 3/2007 | Borkar et al. | 365/63 |
| 2007/0198863 | A1* | 8/2007 | Bose et al. | 713/300 |
| 2008/0244294 | A1* | 10/2008 | Allarey | 713/324 |
| 2009/0322409 | A1* | 12/2009 | Levit et al. | 327/513 |

* cited by examiner

*Primary Examiner* — Dennis M Butler
(74) *Attorney, Agent, or Firm* — Turocy & Watson, LLP

(57) ABSTRACT

A system and method are provided for a system-on-chip (SoC) management module to monitor and dynamically control processor core operating voltages. An SoC is provided with a plurality of processor cores, a plurality of voltage regulators, an internal management module, and at least one temperature sensor. The management module compares monitored temperatures to threshold values, and in response generates voltage commands. The management module sends the voltage commands to the voltage regulators. Each voltage regulator adjusts the operating voltage supplied to a corresponding processor core in response to the voltage commands.

20 Claims, 6 Drawing Sheets

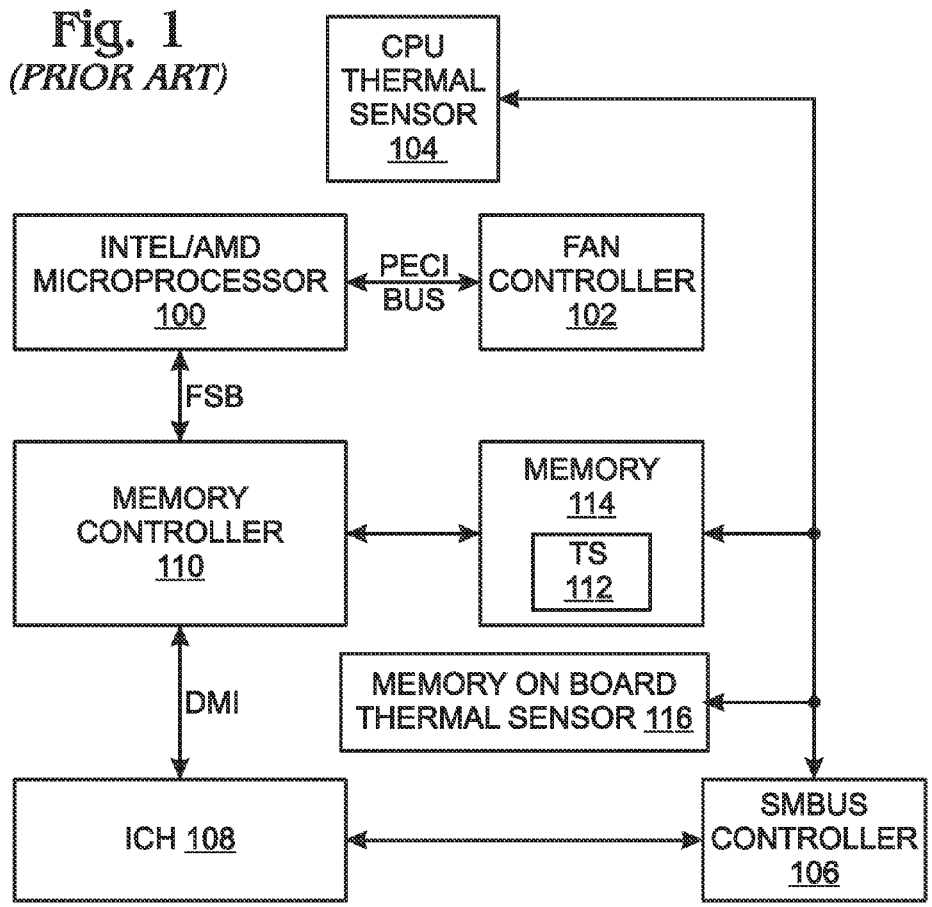

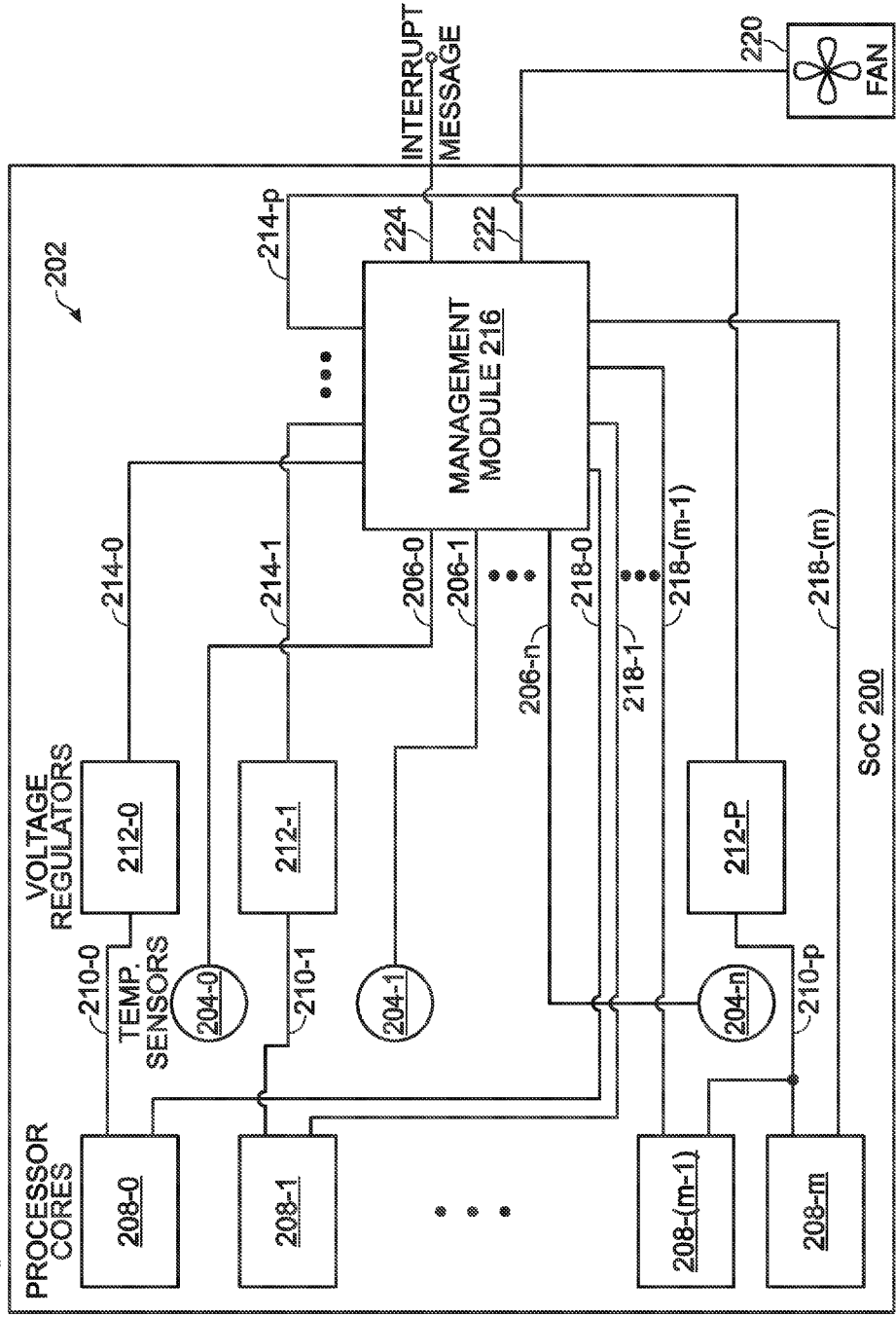

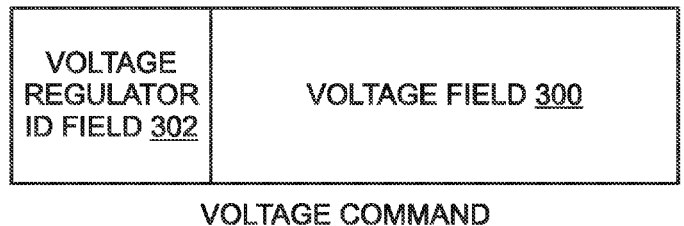
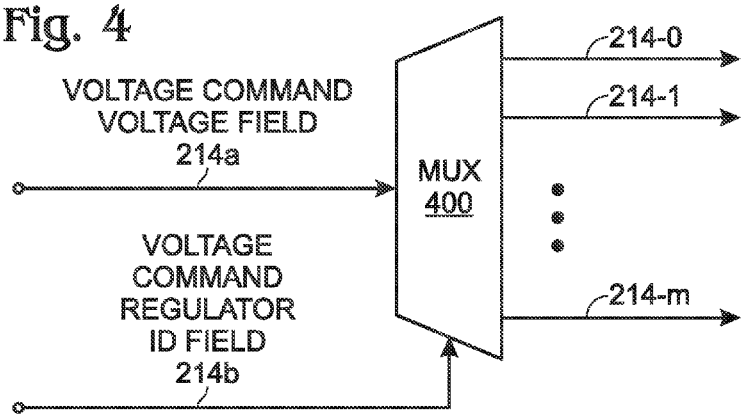
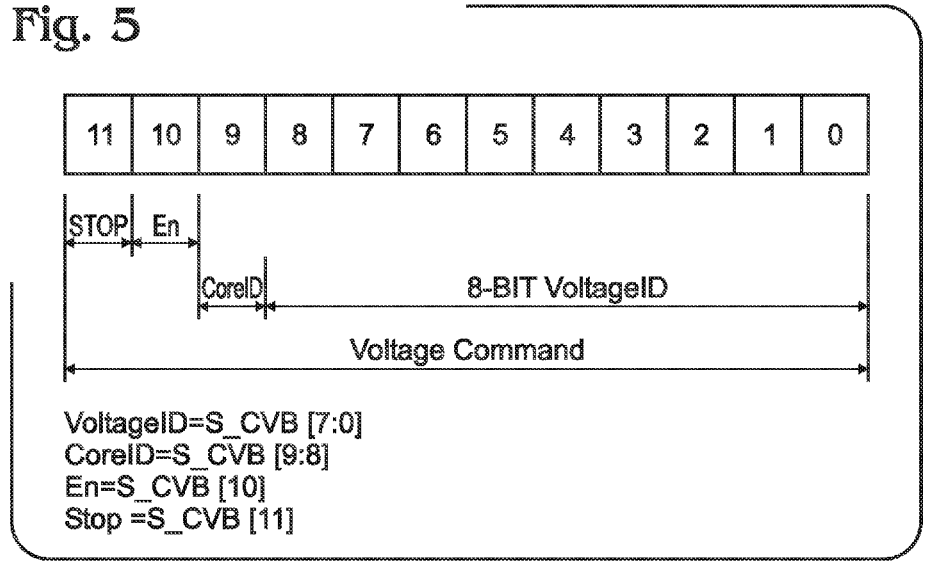

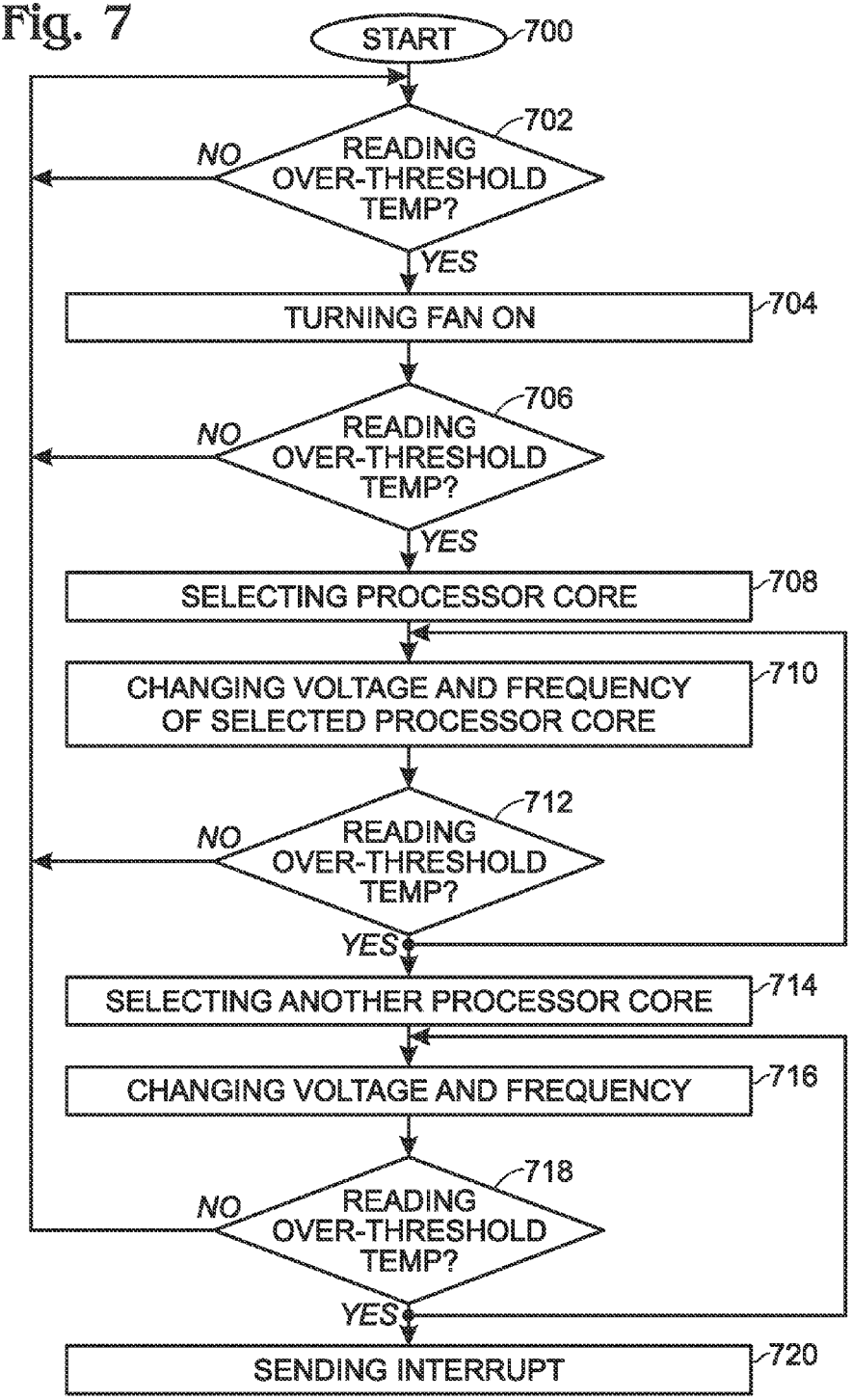

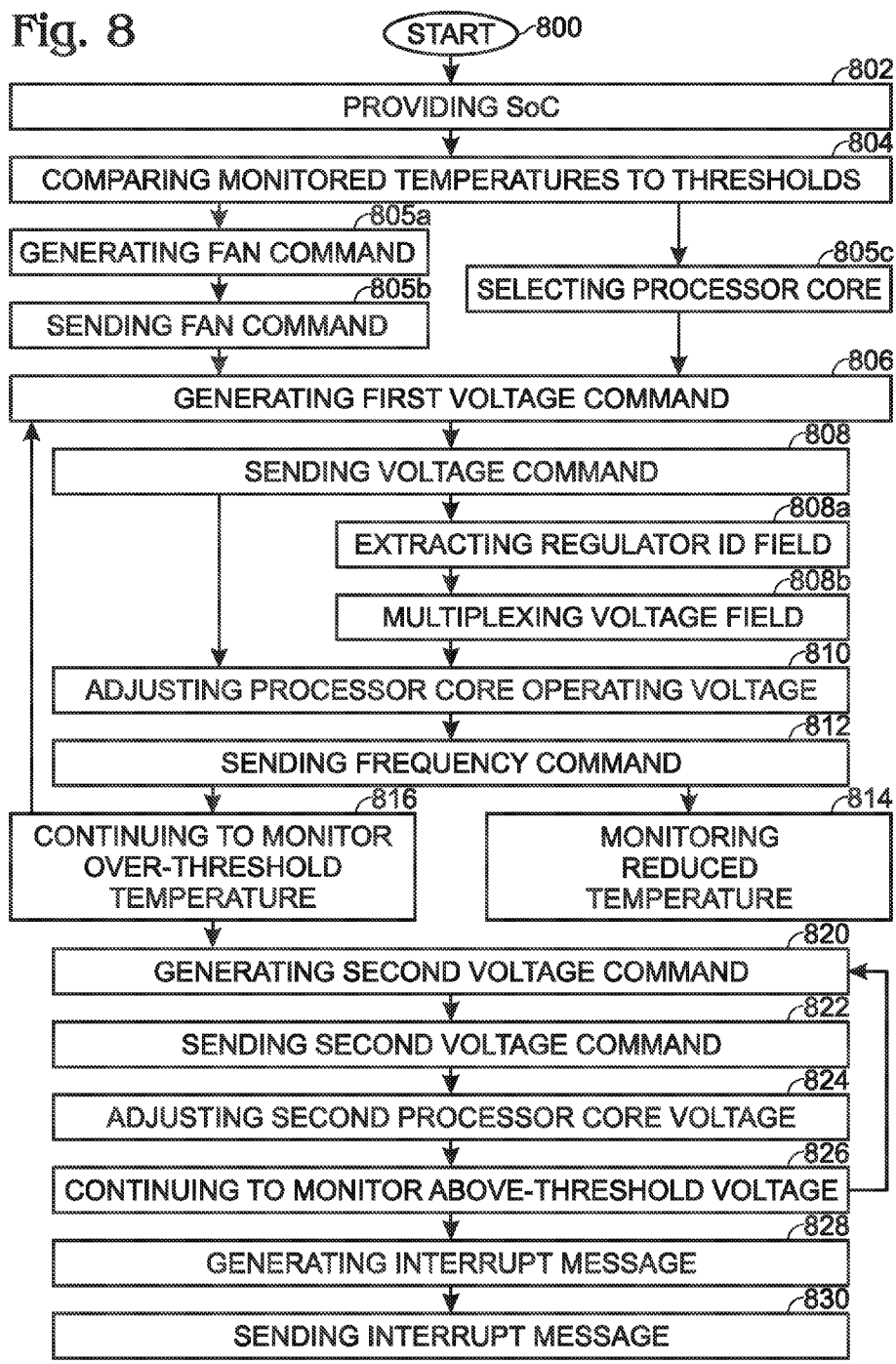

SYSTEM-ON-CHIP WITH MANAGEMENT MODULE FOR CONTROLLING PROCESSOR CORE INTERNAL VOLTAGES

RELATED APPLICATIONS

This application is a Continuation-in-Part of a pending application entitled, SYSTEM-ON-CHIP WITH THERMAL MANAGEMENT CORE, invented by Waseem Kraipak et al., Ser. No. 12/687,817, filed Jan. 14, 2010;

which is a Continuation-in-Part of a pending application entitled, SYSTEM-ON-CHIP WITH FEEDBACK LOOP FOR PROCESSOR FREQUENCY CONTROL, invented by Waseem Kraipak et al., Ser. No. 12/639,064, filed Dec. 16, 2009. Both these applications are incorporated herein by reference.

BACKGROUND OF THE INVENTION

1. Field of the Invention

This invention generally relates to system-on-chip (SoC) processor core management and, more particularly, to a system and method for using a hardware core and dedicated communication interfaces to monitor and control SoC processor core voltages and operating frequencies.

2. Description of the Related Art

FIG. 1 is a schematic block diagram of a processor indirectly connected to temperature sensors (prior art). Conventionally, a microprocessor 100 communicates directly with the fan controller 102 via the platform environment control interface (PECI) bus. However, the CPU sensor 104, whether mounted on or near the CPU 100, must relay its readings via the system management bus (SMBUS) and SMBUS controller 106, the I/O controller hub (ICH) or southbridge 108, the digital media interface (DMI), the memory controller (northbridge) 110, and the front side bus (FSB). Likewise, a sensor (TS) 112 mounted on the memory 114, or a sensor 116 mounted on the board near the memory takes the same indirect path. This indirect path requires communication between different subsystems, making the monitoring process relatively complex and slow. With respect to the processor 100, the temperature monitoring and fan control processes are managed by operating system (OS) software, again making these processes relatively complex and slow, as well as interrupting the processor from completing other tasks. The CPU temperature can also be regulated by controlling the processor operating frequency. Conventionally however, the frequency of operation is changed through manually intervention to modify the dc supply voltage or through a software mechanism. Manual intervention and software mechanisms are both relatively cumbersome.

Conventionally, there is only one core voltage source that feeds voltage to all the processor cores inside a SoC. Reducing the voltage for one core results in a voltage reduction for all the cores, and degrades the performance of all the cores. A disadvantage of this architecture is that if there is a voltage failure for the core voltage, all the cores are affected. Similarly, a core that develops a physical problem may affect all the other cores indirectly through the voltage bus.

It would be advantageous if the processor core operating voltages of an SoC could be individually managed by a dedicated management core (hardware block).

SUMMARY OF THE INVENTION

Described herein is a system-on-chip (SoC) with a plurality of processor cores that can be independently operated at different voltage levels and frequencies. This system is able to provide an overall power savings and finer performance tuning. Since each core in the SoC can operate at a different voltage level and frequency, only cores that are performing higher priority tasks, depending on their quality of service (QoS) requirements, need be run at higher frequencies. Cores that are unused can be completely powered off for maximum power savings. Core operating frequencies, and number of cores used can be configured based on the immediate and predicted needs. As a result, battery life can be optimized and heat signatures minimized.

Further, when a management core detects any temperatures crossing a threshold value, it sends a command to a particular core and associated core voltage regulator to take an action to cool the processor core, as well communicating to a fan control device to regulate the speed of a fan. The fan need not run all the time, as it may only be turned on whenever the processor core temperature crosses the threshold value. Minimal use of the fan reduces noise generation and saves power.

If the management core detects that one of the voltages is outside of the requested setting and specification range before, during, or after a voltage change, it can flag the out of specification voltage to the user. Also, items being executed by the core can be moved to a different core and the out of specification core voltage can be shut down until it is fixed or replaced. This enhances the overall reliability and survivability of the system. In some systems, the voltage regulator subsystem can be hot pluggable and, hence, replaceable while the system is still online. If an out of specification voltage is detected during power on, the core to which the voltage regulator is assigned is not activated and the voltage regulator shut down until it is replaced, so that the chip is protected.

Accordingly, a method is provided in a system-on-chip (SoC), management module to monitor and dynamically control processor core operating voltages. An SoC is provided with a plurality of processor cores, a plurality of voltage regulators, an internal management module, and at least one temperature sensor. The management module compares monitored temperatures to threshold values, and in response generates voltage commands. The management module sends the voltage commands to the voltage regulators. Each voltage regulator adjusts the operating voltage supplied to a corresponding processor core in response to the voltage commands.

For example, the management module may monitor an above-threshold temperature recorded by a first temperature sensor, and generate a first voltage command to decrease a first voltage supplied by a first voltage regulator. A decreased first voltage is supplied to a first processor core, and the management module sends a first frequency command to the first processor core, directing the first processor core to operate at a reduced processor frequency. Typically, the management module is able to monitor a reduced temperature recorded by the first temperature sensor in response to the first voltage command and first frequency command.

The management module also performs the task of selecting which processor core(s) to operate at a reduced voltage. This selection function is performed in response to analyzing criteria such as processor core priority, processor core workload, the priority of tasks being performed by processor cores, the thermal linkage between the first temperature sensor and the processor cores, and combinations of the above-mentioned criteria.

Additional details of the above-described method, and a SoC with a system for monitoring and dynamically controlling processor core operating voltages, are provided below.

BRIEF DESCRIPTION OF THE DRAWINGS

FIG. 1 is a schematic block diagram of a processor indirectly connected to temperature sensors (prior art).

FIG. 2 is a schematic block diagram of a system-on-chip (SoC) with a system for monitoring and dynamically controlling processor core operating voltages.

FIG. 3 is a diagram depicting an exemplary voltage command format.

FIG. 4 is a schematic block diagram depicting an exemplary voltage command distribution bus to support the voltage command format of FIG. 3.

FIG. 5 is a more detailed depiction of the voltage command format of FIG. 3.

FIG. 7 is a flowchart illustrating a process for lowering the voltage and frequency of SoC processor cores in response to sensing over-threshold temperatures.

FIG. 8 is a flowchart illustrating a method for using a management module to monitor and dynamically control processor core operating voltages on an SOC.

DETAILED DESCRIPTION

Figure 6:
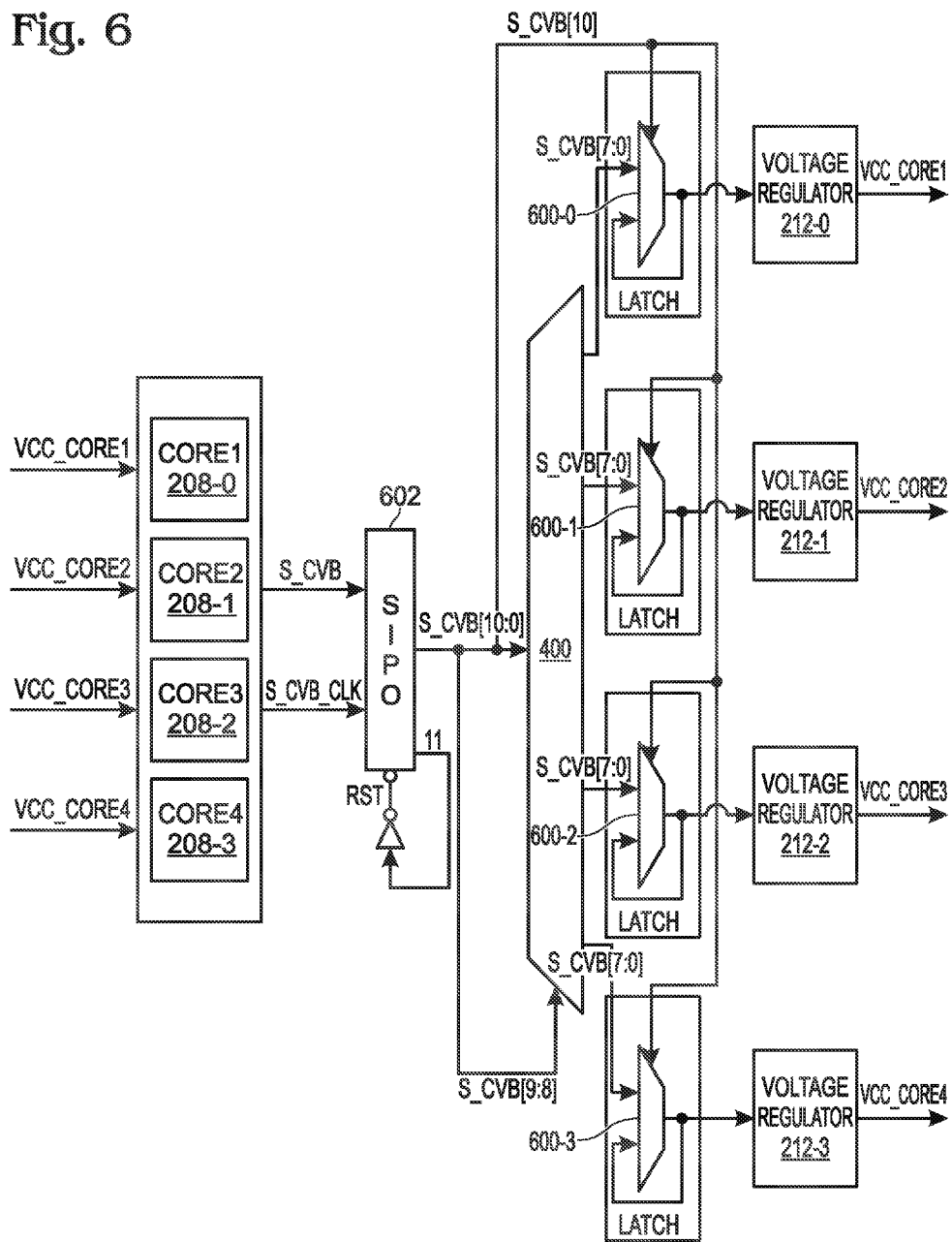
FIG. 6 is a more detailed depiction of the schematic block diagram of FIG. 4 to support the voltage command format of FIG. 5.

FIG. 2 is a schematic block diagram of a system-on-chip (SoC) 200 with a system for monitoring and dynamically controlling processor core operating voltages. The system 202 comprises a temperature sensor 204 having an output on line 206 to supply a temperature reading. Shown are a plurality of temperature sensors 204-0 through 204-n, where n is an integer variable not limited to any particular value. The system 202 includes a plurality of processor cores 208, each having an input on line 210 to receive an operating voltage. Shown are processor cores 208-0 through 208-m, where m is an integer variable not limited to any particular value. In one aspect, the temperature sensors 204 are physically mounted in a location near the processor cores 208. Alternatively but not shown, the sensors 204 are co-located with the processor.

The system 202 also includes a plurality of voltage regulators 212. Each voltage regulator 212 has an input on line 214 to receive a voltage command and an output on line 210 to supply an operating voltage to a processor core responsive to the voltage command on line 214. Shown are voltage regulators 212-0 through 212-p, where p is an integer variable not limited to any particular value. An internal management module 216 has an input on line 206 to accept temperature readings. The management module 216 generates voltage commands supplied at an output on line 214 in response to comparing monitored temperatures to threshold values.

For example, the management module 216 may monitor an above-threshold temperature recorded by a first temperature sensor 204-0 and generate a first voltage command on line 214-0. Then, the first voltage regulator 212-0 decreases a first operating voltage supplied to a first processor core 208-0 in response to the first voltage command on line 214-0. In one aspect, each processor core 208 also has an input on line 218 to accept an operating frequency command. Then, the management module 216 may send a first frequency command to the first processor core on line 218-0, directing the first processor core 208-0 to operate at a reduced processor frequency. If the above-mentioned operations are successful, the management module 216 is able to monitor a reduced temperature recorded by the first temperature sensor 204-0 in response to the first voltage command and first frequency command.

The management module 216 is an independent processor core hardware block that is able to function without off-SoC commands or user direction. One function performed by the management module is the selection of the voltages and frequencies at which the various processor cores operate. In the above example, the management module 216 selects the first processor core 208-0 to operate at a reduced voltage in response to monitoring the above-threshold temperature recorded by a first temperature sensor. This selection process is responsive to the management core analyzing criteria.

One such criterion is processor core priority. For example, processor core 208-0 may be assigned the lowest priority, so that it is the first to be cooled in the event of a thermal problem. The criterion may also include processor core workload. For example, the first processor core 208-0 may be selected because it is determined that it has a smaller workload than the other processor cores. Another criterion may be the priority of tasks being performed by processor cores. In this case, the management core would most likely be linked to an operating system (OS) module or software application able to prioritize the applications being supported by a processor core. Another criterion is the thermal linkage between the first temperature sensor and the processor cores. For example, the first processor core may be selected because it is physically closest to the temperature sensor. Note: the consideration of physical distance may be tempered with the consideration of printed circuit board (PCB) structure (i.e., the amount of metal between the sensor and the processor or the placement of PCB heat sinks or fans). Further, the processor selection may be based upon a combination of the above-mentioned criteria.

FIG. 3 is a diagram depicting an exemplary voltage command format. For example, the management module may generate voltage commands each including a voltage field 300 and a voltage regulator identification (ID) field 302.

FIG. 4 is a schematic block diagram depicting an exemplary voltage command distribution bus to support the voltage command format of FIG. 3. A multiplexer (MUX) 400 has a signal input on line 214a to accept the voltage field, a control input on line 214b to accept the voltage regulator ID field. A plurality of signal outputs 214-0 through 214-m, are selected in response to the voltage regulator ID field. Each signal output is connected to the input of a corresponding voltage regulator.

Returning to FIG. 2, in one aspect the management module 216, prior to generating the first voltage command, generates a fan command on line 222 that is sent to a fan 220 external to the SoC 200, directing the fan to initiate operation. If the management module 216 continues to monitor an above-threshold temperature recorded by the first temperature sensor 204-0 subsequent to initiating the fan operation, it then generates the first voltage command to lower the supply voltage to the first processor core 208-0.

Alternatively, if the management module, subsequent to sending the first frequency command, continues to monitor an above-threshold temperature recorded by the first temperature sensor 204-0, it may generate a modified first voltage command on line 214-0 to further decrease the first voltage supplied by the first voltage regulator 212-0. The management module 216 may further send a modified first frequency command on line 218-0 directing the first processor core 208-0 to further reduce the processor frequency.

In a different aspect, the management module 216, subsequent to sending the first frequency command, continues to monitor an above-threshold temperature recorded by the first temperature sensor 204-0. In this case, the management module may generate a second voltage command sent for a second processor core (208-1), having a higher priority than the first processor core 208-0. The second voltage regulator 212-1 adjusts the operating voltage supplied to the second processor core 208-1 in response to the second voltage command.

Subsequent to sending a second frequency command on line 218-1 directing the second processor core 208-1 to operate at a reduced processor frequency, the management module 216 may continue to monitor an above-threshold temperature recorded by the first temperature sensor 204-0. In this case the management module may generate an interrupt message, sent via an external interface on line 224, indicating that the SoC is operating at an above-threshold temperature.

As used herein, the term "core" refers to an integrated circuit die of connected hardware sub-components that supply electrical signals in response to electrical signal stimuli. While these electrical signals may be indirectly affected by software operations performed external to die, there is no processor or software application internal to the die generating electrical signals. Any logic functions performed internal to the core are the result of a hardware based state machine type logic.

Additional details of the management module, also referred to as a thermal management core, can be found in the parent application entitled, SYSTEM-ON-CHIP WITH THERMAL MANAGEMENT CORE, invented by Waseem Kraipak et al., Ser. No. 12/687,817, filed Jan. 14, 2010, which is incorporated herein by reference. Other details of the management module, also referred to as a controller, can be found in the parent application entitled, SYSTEM-ON-CHIP WITH FEEDBACK LOOP FOR PROCESSOR FREQUENCY CONTROL, invented by Waseem Kraipak et al., Ser. No. 12/639,064, filed Dec. 16, 2009, which is incorporated herein by reference.

Functional Description

FIG. 5 is a more detailed depiction of the voltage command format of FIG. 3. This 12-bit protocol can be used to control the voltage for individual processor cores. The lower 8 bits are the VID (voltage ID) bits that indicate the desired voltage level. Bit[9:8] indicate the COREID. The COREID selects the voltage regulator being addressed. Bit 10 is the enable bit. Bit 11 is a stop bit.

FIG. 6 is a more detailed depiction of the schematic block diagram of FIG. 4 to support the voltage command format of FIG. 5. Bit 10 of the voltage command is used to latch MUXs 600, and bit 11 is used to reset the serial in/parallel out (SIPO) device 602. Note: the voltage command is accompanied by a clock (S_CVB_CLK).

For example, the SoC may be a quad-core central processing unit (CPU) running different applications on the CPU. Typically, a single core is operational and the other cores are idle. If the application is currently being executed on CORE1, then CORE2, CORE3, and CORE4 are just in an idle mode. In this case, the management module monitoring the activities for each core might make the following decision. The management module may start increasing the frequency of CORE1 by sending a 12 Bit VID packet for CORE1. The frequency and voltage may be increased in steps.

Each VID bit is transmitted serially on the positive edge of the S_CVB_CLK. The SIPO 602 coverts this bit stream into parallel bits. S_CVB [9:8] are the voltage regulator ID, which typically corresponds to a processor core with a dedicated voltage regulator. These bits enable a corresponding latch. Bit 10 is used as an enable to latch. When it is asserted, the new 8-bit VID value is at the output of the latch. Bit 11 is used as a reset or clear signal. When this bit is asserted at the next rising edge of the clock signal, the SIPO out is cleared. This means Bit 10 is deasserted and the 8 VID bits are latched.

The output of each latch 600 is connected to a voltage regulator 212. Each voltage regulator adjusts a core voltage. Thus, CORE1 can be put to a new voltage level. Similarly, the management module may begin to put CORE2 and CORE3 in low frequency and low voltage domain, ensuring that CORE1 can safely work at the highest frequency and voltage levels. Overall, the core power is reduced by around 75%.

In another example, a user is running two applications being executed on CORE1 and CORE2. CORE1 is running an office type of application and CORE2 is running a graphics type of application. CORE3 and CORE4 are just in the idle mode and are not executing any applications. The management module decides to lower the operating voltage and frequency of CORE3. As in the first example, each VID bit is transmitted serially on the positive edge of the S_CVB_CLK. Similarly, the voltage and frequency of CORE4 may be lowered. The management module can then put CORE1 and CORE2 at optimal frequency and voltage domain levels, depending upon the work load. These operations can reduce the overall core power by around 50%.

FIG. 7 is a flowchart illustrating a process for lowering the voltage and frequency of SoC processor cores in response to sensing over-threshold temperatures. The process begins at Step 700. If an over-threshold temperature is detected in Step 702, Step 704 turns on a fan. If an over-threshold temperature is not detected in Step 706, the process returns to Step 702. Otherwise, Step 708 selects one or more processor cores. Step 710 lowers the operating voltages and frequency of the selected processor core. If an over-threshold temperature is not detected in Step 712, the process returns to Step 702. Otherwise, the process may return to Step 710 to lower the voltage and frequency again. Alternatively, Step 714 may select another processor core(s) and Step 716 lowers the voltage and frequency of the selected core. If an over-threshold temperature is not detected in Step 718, the process returns to Step 702. Otherwise, the process may return to Step 716 to lower the voltage and frequency again. Alternatively, Step 710 may send an interrupt message to an off-SoC destination.

FIG. 8 is a flowchart illustrating a method for using a management module to monitor and dynamically control processor core operating voltages on an SOC. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 800.

Step 802 provides an SoC with a plurality of processor cores, a plurality of voltage regulators, an internal management module, and a temperature sensor. In Step 804 the management module compares monitored temperatures to threshold values. In response to comparing monitored temperatures to the threshold values, the management module generates voltage commands in Step 806. In Step 808 the management module sends the voltage commands to the voltage regulators. In Step 810 each voltage regulator adjusts the operating voltage supplied to a corresponding processor core in response to the voltage commands.

In one aspect, comparing monitored temperatures to threshold values in Step 804 includes monitoring an above-threshold temperature recorded by a first temperature sensor. Generating the voltage commands in Step 806 includes generating a first voltage command to decrease a first voltage supplied by a first voltage regulator, and adjusting the operating voltage supplied to the corresponding processor core in response to the voltage commands in Step 810 includes supplying the decreased first voltage to a first processor core. In a further step, Step 812, the management module may send a first frequency command to the first processor core, directing the first processor core to operate at a reduced processor frequency. In Step 814 the management module monitors a reduced temperature recorded by the first temperature sensor in response to the first voltage command and first frequency command. Note: Step 812 may be performed concurrently with Steps 806 through 810.

In another aspect, the management module selects the first processor core to operate at a reduced voltage in Step 805*c*, in response to monitoring the above-threshold temperature recorded by a first temperature sensor. The management module selects the first processor core to operate at a reduced voltage in response to analyzing criteria such as processor core priority, processor core workload, the priority of tasks being performed by processor cores, the thermal linkage between the first temperature sensor and the processor cores, and combinations of the above-mentioned criteria.

Subsequent to sending the first frequency command in Step 806, Step 816 may continue to monitor an above-threshold temperature recorded by the first temperature sensor. Then Step 806 generates a modified first voltage command to further decrease the first voltage supplied by the first voltage regulator, and Step 812 sends the modified first frequency command directing the first processor core to further reduce the processor frequency.

In one aspect, generating the voltage command in Step 806 includes generating a voltage command including a voltage field and a voltage regulator identification (ID) field. Sending the voltage command in Step 808 then includes the following substeps. Step 808*a* extracts the voltage regulator ID field, and Step 808*b* multiplexes the voltage field to a voltage regulator associated with the extracted voltage regulator ID field.

In another aspect, prior to generating the first voltage command in Step 806, Step 805*a* generates a fan command and Step 805*b* sends the fan command to a fan external to the SoC, directing the fan to initiate operation or increase speed if applicable. Then, the first voltage command is generated in Step 806 in response to continued monitoring of an above-threshold temperature recorded by the first temperature sensor, subsequent to initiating the fan operation.

In a different aspect, subsequent to sending the first frequency command in Step 806, Step 816 continues to monitor an above-threshold temperature recorded by the first temperature sensor. Step 820 generates a second voltage command. Step 822 sends the second voltage command for a second processor core, having a higher priority than the first processor core. In Step 824 a second voltage regulator adjusts the operating voltage supplied to the second processor core in response to the second voltage command.

Subsequent to sending a second frequency command in Step 822, directing the second processor core to operate at a reduced processor frequency, Step 826 may continue to monitor an above-threshold temperature recorded by the first temperature sensor. Then, Step 828 generates an interrupt message, indicating that the SoC is operating at an above-threshold temperature, and Step 830 sends the interrupt message via an external interface.

A system and method have been provided for using a management module to independently control processor cores in a SoC. Examples of particular message structures, processors, and hardware units have been presented to illustrate the invention. However, the invention is not limited to merely these examples. Other variations and embodiments of the invention will occur to those skilled in the art.

We claim:

1. A method for using a management module to monitor and dynamically control processor core operating voltages, comprising:

providing a system-on-chip (SoC) with a processor core, a voltage regulator, an internal management module, and a temperature sensor;

the management module comparing a monitored temperature to a threshold value;

in response to comparing the monitored temperature to the threshold value, the management module modifying a voltage level of the processor core independently and to a different voltage level of at least one other processor core on the SoC by generating a voltage command to the voltage regulator;

the management module sending the voltage command to the voltage regulator; and, the voltage regulator adjusting the operating voltage supplied to the processor core in response to the voltage command.

2. The method of claim 1 wherein comparing the monitored temperature to a threshold value comprises monitoring an above-threshold temperature recorded by a first temperature sensor;

wherein generating the voltage command comprises generating a first voltage command to decrease a first voltage supplied by a first voltage regulator;

wherein adjusting the operating voltage supplied to the processor core in response to the voltage command comprises supplying the decreased first voltage to a first processor core;

the method further comprising:

the management module sending a first frequency command to the first processor core, directing the first processor core to operate at a reduced processor frequency; and, the management module monitoring a reduced temperature recorded by the first temperature sensor in response to the first voltage command and first frequency command.

3. The method of claim 2 further comprising:

in response to monitoring the above-threshold temperature recorded by a first temperature sensor, the management module selecting the first processor core to operate at a reduced voltage.

4. The method of claim 3 wherein the management module selecting the first processor core to operate at a reduced voltage comprises selecting the first processor core from among processor cores in response to one or more analyzing criteria comprising processor core priority, processor core workload, priority of tasks being performed by the processor cores, thermal linkage between the first temperature sensor and the processor cores, or combinations of the one or more analyzing criteria.

5. The method of claim 1 wherein generating the voltage commands comprises generating a voltage field and a voltage regulator identification (ID) field that are respectively associated with a plurality of voltage regulators and are different among voltage commands generated by the management module, in response to the management module selecting which processor core among processor cores to correspondingly reduce the voltage levels based on one or more analyzing criteria.

6. The method of claim 5 wherein sending the voltage command comprises:

extracting the voltage regulator ID field; and, multiplexing the voltage field to a voltage regulator associated with the extracted voltage regulator ID field.

7. The method of claim 2 further comprising:

prior to generating the first voltage command, generating a fan command;

sending the fan command to a fan external to the SoC, directing the fan to initiate operation; and, wherein generating the first voltage command comprises generating the first voltage command in response to continuing to monitor an above-threshold temperature recorded by the first temperature sensor, subsequent to initiating the fan operation.

8. The method of claim 2 further comprising:

subsequent to sending the first frequency command, continuing to monitor an above-threshold temperature recorded by the first temperature sensor;

generating a second voltage command;

sending the second voltage command for a second processor core, having a higher priority than the first processor core; and, a second voltage regulator adjusting the operating voltage supplied to the second processor core in response to the second voltage command.

9. The method of claim 8 further comprising:

subsequent to the sending a second frequency command, directing the second processor core to operate at a reduced processor frequency, continuing to monitor an above-threshold temperature recorded by the first temperature sensor;

generating an interrupt message, indicating that the SoC is operating at an above-threshold temperature; and, sending the interrupt message via an external interface.

10. The method of claim 2 further comprising:

subsequent to sending the first frequency command, continuing to monitor an above-threshold temperature recorded by the first temperature sensor;

wherein generating the first voltage command comprises generating a modified first voltage command to further decrease the first voltage supplied by the first voltage regulator; and, wherein sending the first frequency command comprises sending a modified first frequency command directing the first processor core to further reduce the processor frequency.

11. A system-on-chip (SoC) with a system for monitoring and dynamically controlling processor core operating voltages, comprising:

a first temperature sensor having an output to supply a temperature reading;

a first processor core having an input to receive an operating voltage;

a first voltage regulator having an input to receive a first voltage command and an output to supply an operating voltage to the first processor core responsive to the first voltage command; and, a management module having an input to accept a temperature reading, the management module generating the first voltage command supplied at an output in response to a comparison of a monitored temperature to a threshold value and a selection of the first processor core based on one or more analyzing criteria to reduce the operating voltage.

12. The SoC system of claim 11 wherein the first processor core has an input to accept an operating frequency command;

wherein the management module monitors an above-threshold temperature recorded by the first temperature sensor and generates the first voltage command;

wherein the first voltage regulator decreases a first operating voltage, supplied to the first processor core, in response to the first voltage command; and, wherein the management module sends a first frequency command to the first processor core, directing the first processor core to operate at a reduced processor frequency, and monitors a reduced temperature recorded by the first temperature sensor in response to the first voltage command and the first frequency command.

13. The SoC system of claim 12 wherein the management module selects the first processor core to operate at a reduced voltage in response to monitoring the above-threshold temperature recorded by the first temperature sensor.

14. The SoC system of claim 13 wherein the management module selects the first processor core in response to the one or more analyzing criteria comprising processor core priority, processor core workload, priority of tasks being performed by processor cores, thermal linkage between the first temperature sensor and the processor cores, or combinations of the one or more analyzing criteria.

15. The SoC system of claim 11 wherein the management module generates voltage commands comprising a voltage field and a voltage regulator identification (ID) field and independently modifies operating voltages of processor cores via the voltage commands based on the one or more analyzing criteria.

16. The SoC system of claim 15 further comprising:

a multiplexer (MUX) having a signal input to accept the voltage field, a control input to accept the voltage regulator ID field, and a plurality of signal outputs, selected in response to the voltage regulator ID field, where each signal output is connected to the input of a corresponding voltage regulator.

17. The SoC system of claim 12 wherein the management module, prior to generating the first voltage command, generates a fan command that is sent to a fan external to the SoC, directing the fan to initiate operation; and, wherein the management module generates the first voltage command in response to continuing to monitor an above-threshold temperature recorded by the first temperature sensor, subsequent to initiating the fan operation.

18. The SoC system of claim 12 wherein the management module, subsequent to sending the first frequency command, continues to monitor an above-threshold temperature recorded by the first temperature sensor, and generates a second voltage command for a second processor core, having a higher priority than the first processor core; and, wherein a second voltage regulator adjusts the operating voltage supplied to the second processor core in response to the second voltage command.

19. The SoC system of claim 18 wherein the management module, subsequent to the sending a second frequency command directing the second processor core to operate at a reduced processor frequency, continues to monitor an above-threshold temperature recorded by the first temperature sensor, and generates an interrupt message, sent via an external interface, indicating that the SoC is operating at an above-threshold temperature.

20. The SoC system of claim 12 wherein the management module, subsequent to sending the first frequency command, continues to monitor an above-threshold temperature recorded by the first temperature sensor, the management module generating a modified first voltage command to further decrease the first voltage supplied by the first voltage regulator, and sending a modified first frequency command directing the first processor core to further reduce the processor frequency.

* * * * *